(12) United States Patent
Parkman, III et al.

(10) Patent No.: US 11,860,418 B2
(45) Date of Patent: Jan. 2, 2024

(54) DETACHABLE CONNECTORS FOR FUSION SPLICE HIGH FIBER COUNT APPLICATIONS

(71) Applicant: CORNING RESEARCH & DEVELOPMENT CORPORATION, Corning, NY (US)

(72) Inventors: Louis Edward Parkman, III, Keller, TX (US); Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/868,907

(22) Filed: Jul. 20, 2022

(65) Prior Publication Data
US 2023/0024658 A1    Jan. 26, 2023

Related U.S. Application Data

(60) Provisional application No. 63/225,606, filed on Jul. 26, 2021.

(51) Int. Cl.
| | | |
|---|---|---|
| *G02B 6/25* | (2006.01) | |
| *G02B 6/255* | (2006.01) | |
| *G02B 6/36* | (2006.01) | |
| *G02B 6/38* | (2006.01) | |
| *G02B 6/40* | (2006.01) | |
| *G02B 6/44* | (2006.01) | |

(52) U.S. Cl.
CPC ............. *G02B 6/2558* (2013.01); *G02B 6/25* (2013.01); *G02B 6/255* (2013.01); *G02B 6/2551* (2013.01); *G02B 6/3676* (2013.01); *G02B 6/3809* (2013.01); *G02B 6/3885* (2013.01); *G02B 6/40* (2013.01); *G02B 6/441* (2013.01); *G02B 6/4471* (2013.01); *G02B 6/3887* (2013.01); *G02B 6/3895* (2013.01); *G02B 6/4459* (2013.01)

(58) Field of Classification Search
CPC ........ G02B 6/25; G02B 6/255; G02B 6/2551; G02B 6/2558; G02B 6/3676; G02B 6/3809; G02B 6/3885; G02B 6/3887; G02B 6/3895; G02B 6/40; G02B 6/441; G02B 6/4459; G02B 6/4471
See application file for complete search history.

(56) References Cited

U.S. PATENT DOCUMENTS

| | | | |
|---|---|---|---|
| 4,142,776 | A | 3/1979 | Cherin et al. |
| 5,907,650 | A | 5/1999 | Sherman et al. |
| 6,351,590 | B1 | 2/2002 | Shahid |
| 6,352,372 | B1 | 3/2002 | Shahid |
| 6,604,866 | B1 | 8/2003 | Kang et al. |

(Continued)

FOREIGN PATENT DOCUMENTS

| | | |
|---|---|---|
| JP | 11-211929 A | 8/1999 |
| WO | 2002/103403 A2 | 12/2002 |

OTHER PUBLICATIONS

European Patent Application No. 22186777.3, Extended European Search Report dated Dec. 12, 2022; 12 pages; European Patent Office.

*Primary Examiner* — Ryan A Lepisto

(57) ABSTRACT

The present disclosure relates to a fusion splice matched pair detachable connector for high fiber count applications where optical fiber alignment is maintained during processing of the detachable connector.

28 Claims, 12 Drawing Sheets

(56) References Cited

U.S. PATENT DOCUMENTS

| | | |
|---|---|---|
| 8,891,926 B2 | 11/2014 | Demeritt et al. |
| 9,167,626 B1 | 10/2015 | Wu |
| 9,604,261 B2 | 3/2017 | Wu |
| 10,018,782 B2 | 7/2018 | Wu |
| 10,816,743 B2 | 10/2020 | Bickham et al. |
| 2003/0091297 A1 | 5/2003 | Hung et al. |
| 2003/0174998 A1 | 9/2003 | Shevchuk |
| 2005/0031290 A1 | 2/2005 | Shevchuk |
| 2017/0146748 A1 | 5/2017 | Childers et al. |
| 2020/0192040 A1 | 6/2020 | Li et al. |
| 2020/0241211 A1* | 7/2020 | Shonkwiler .......... G02B 6/3809 |

* cited by examiner

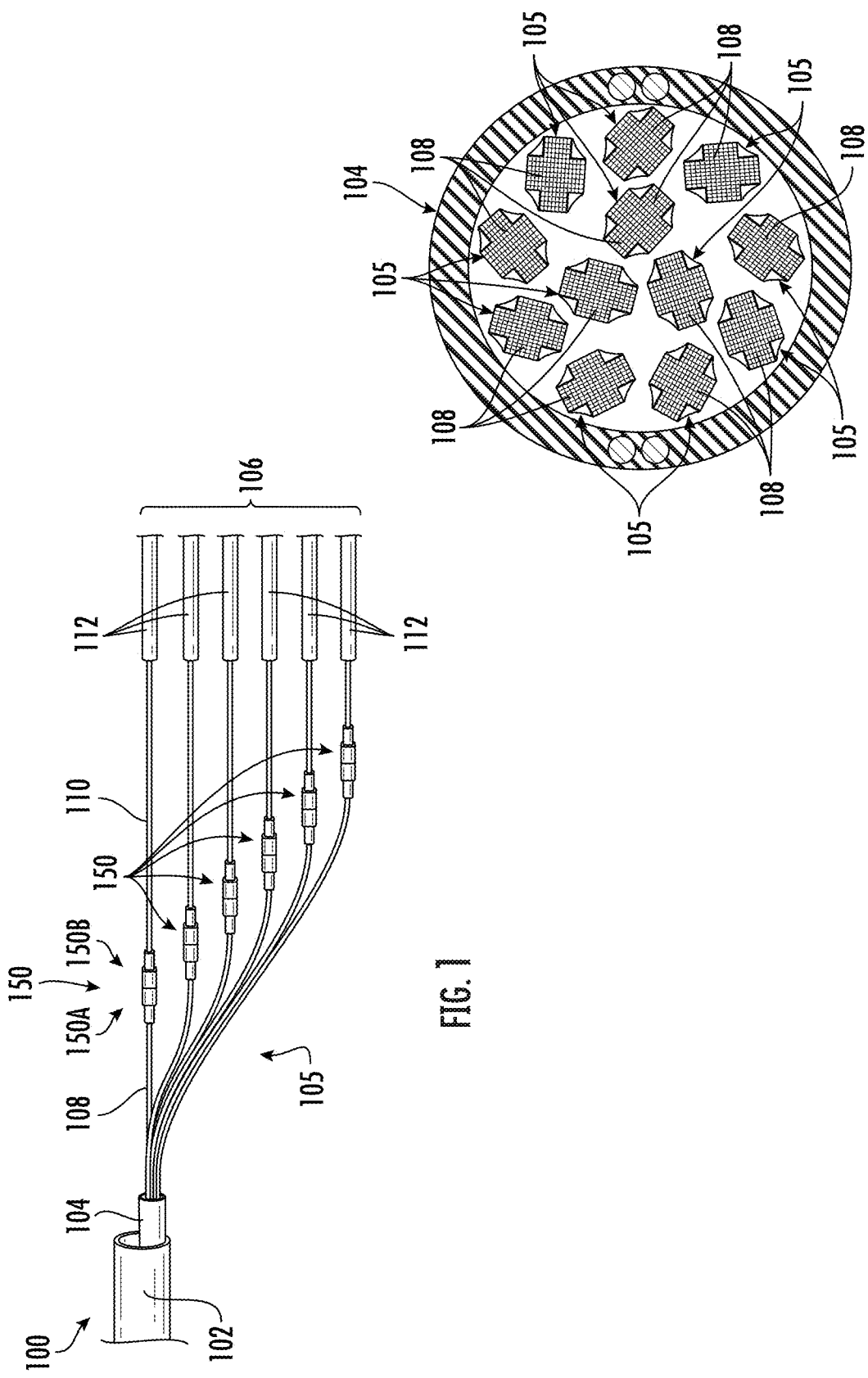

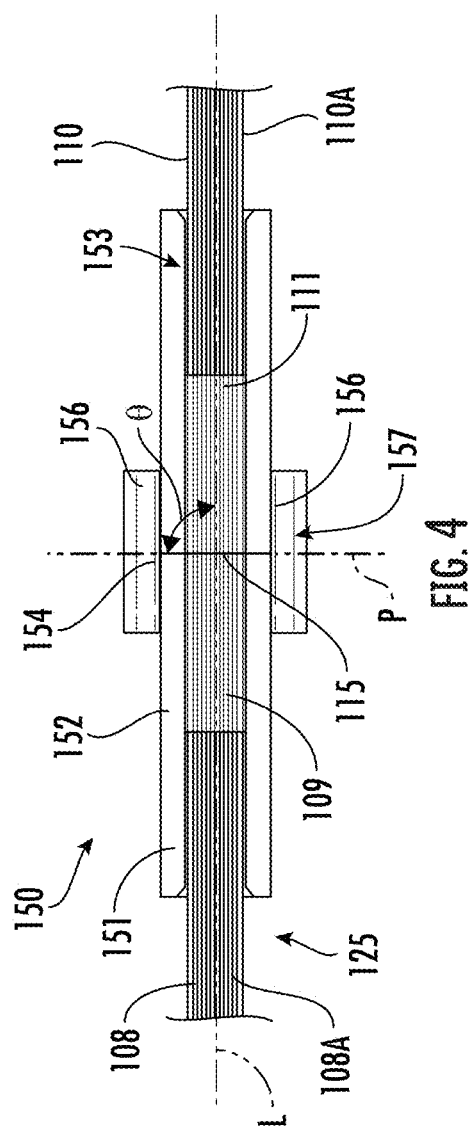
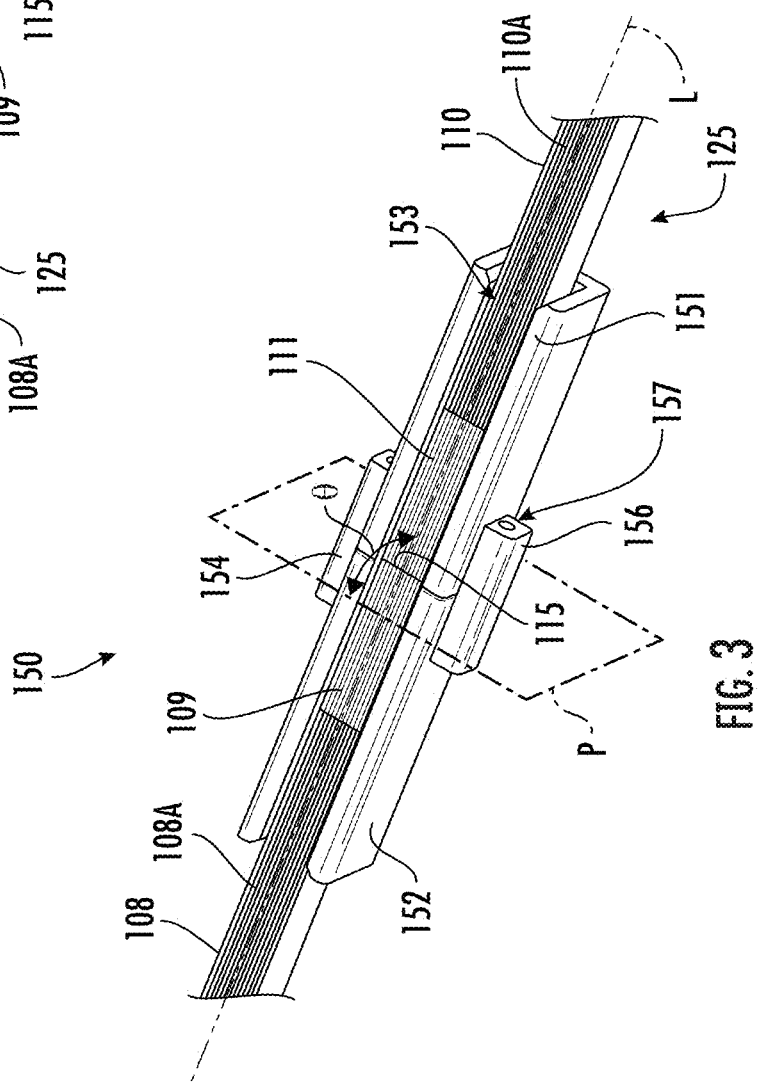

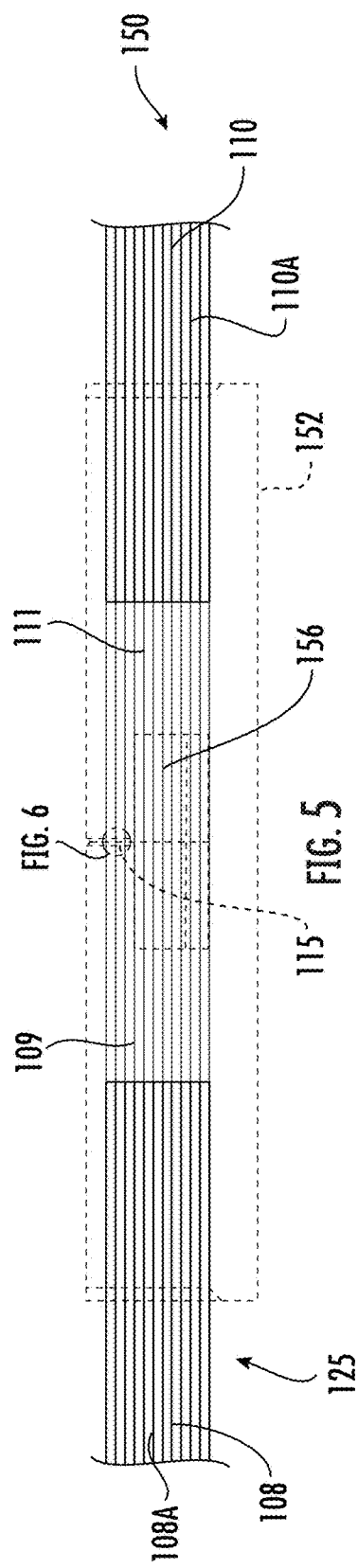
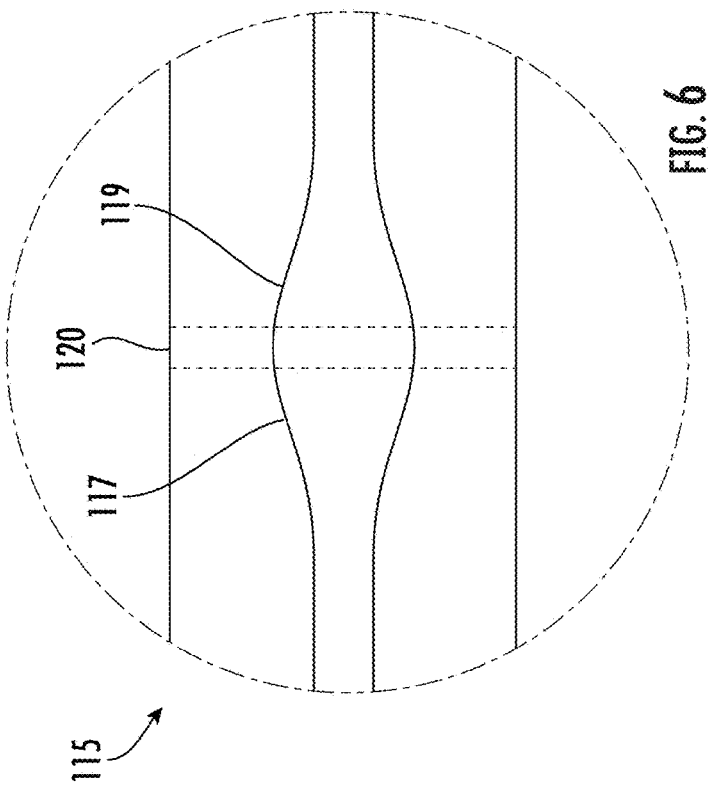

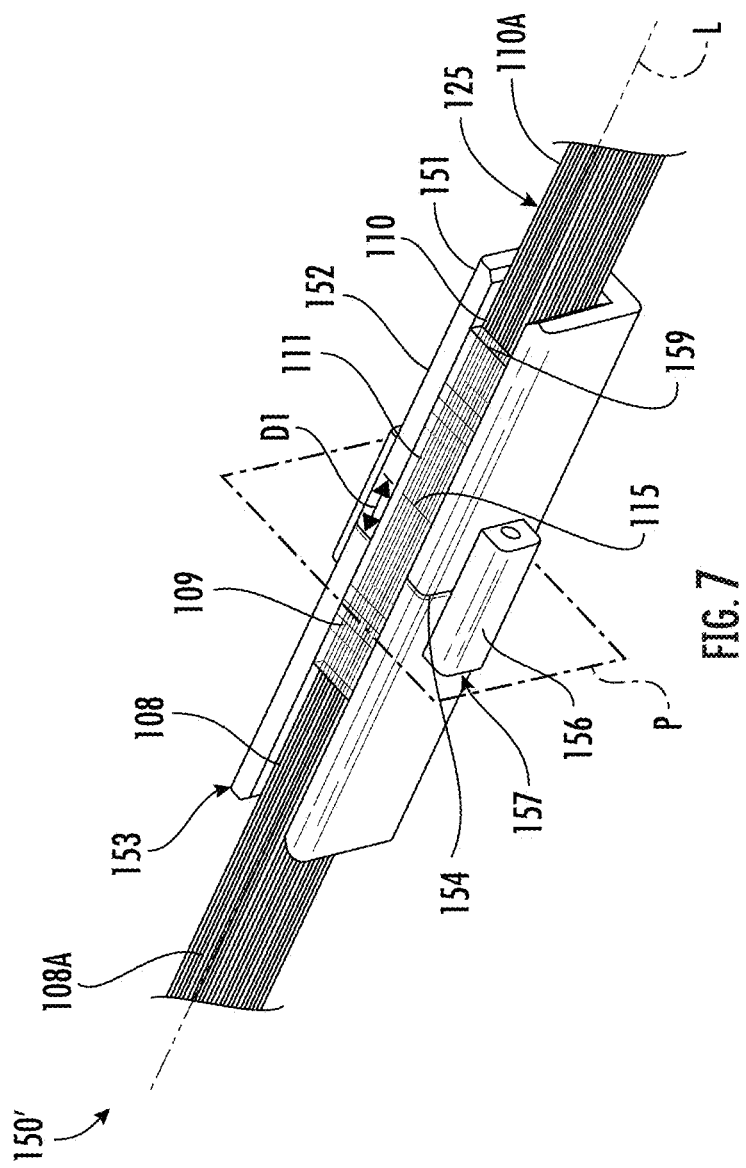

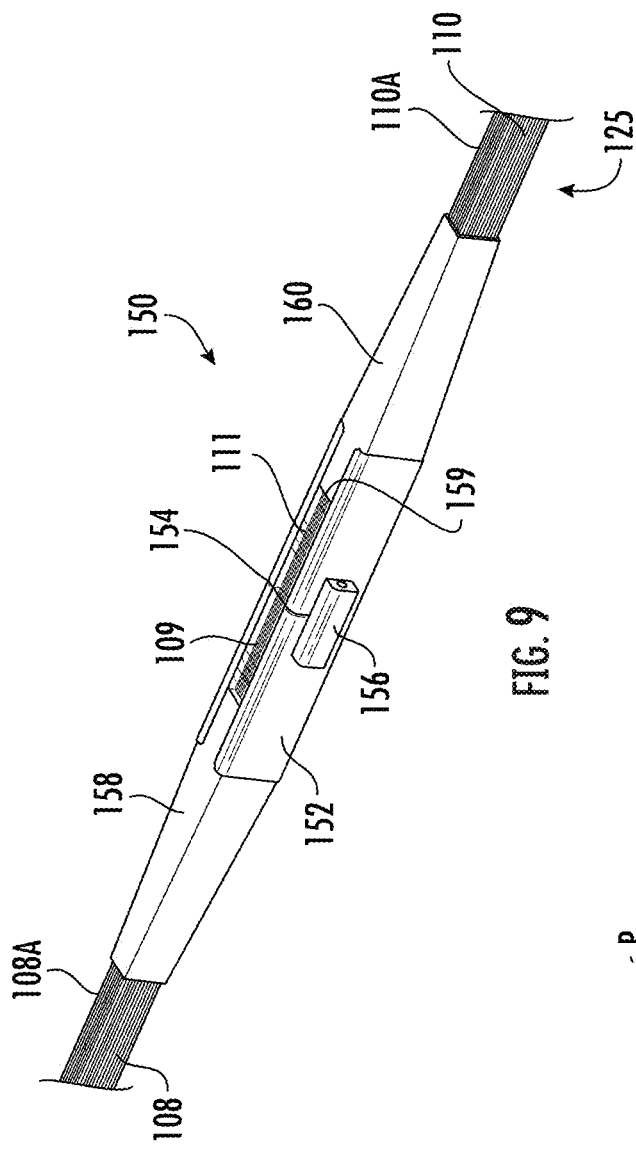
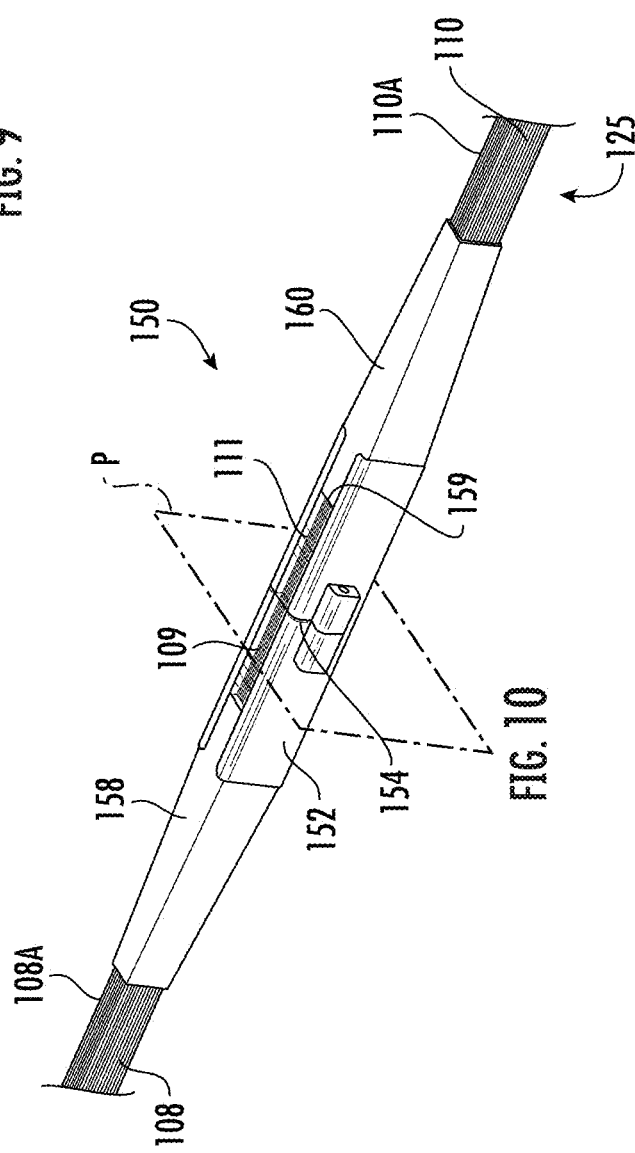

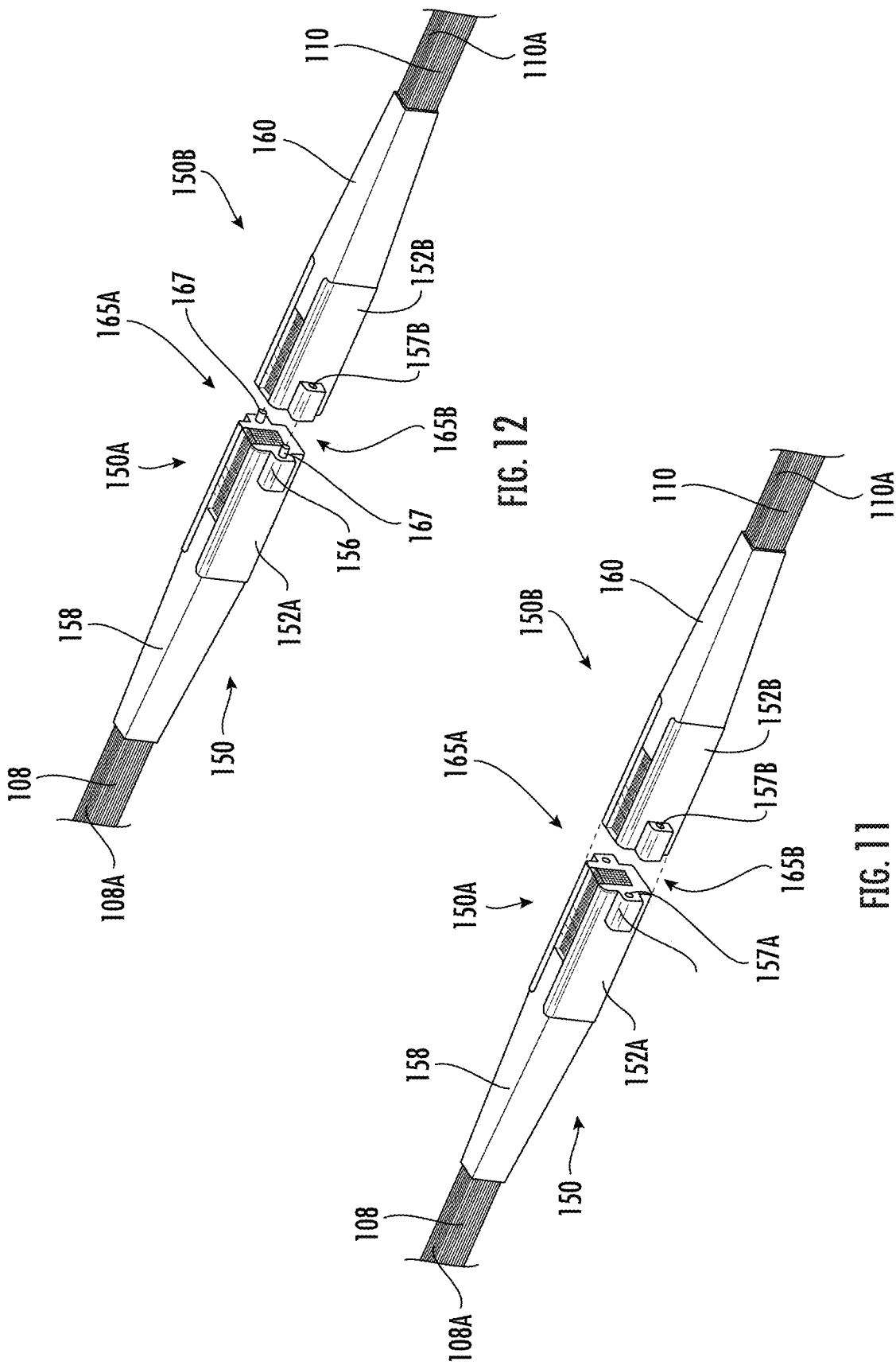

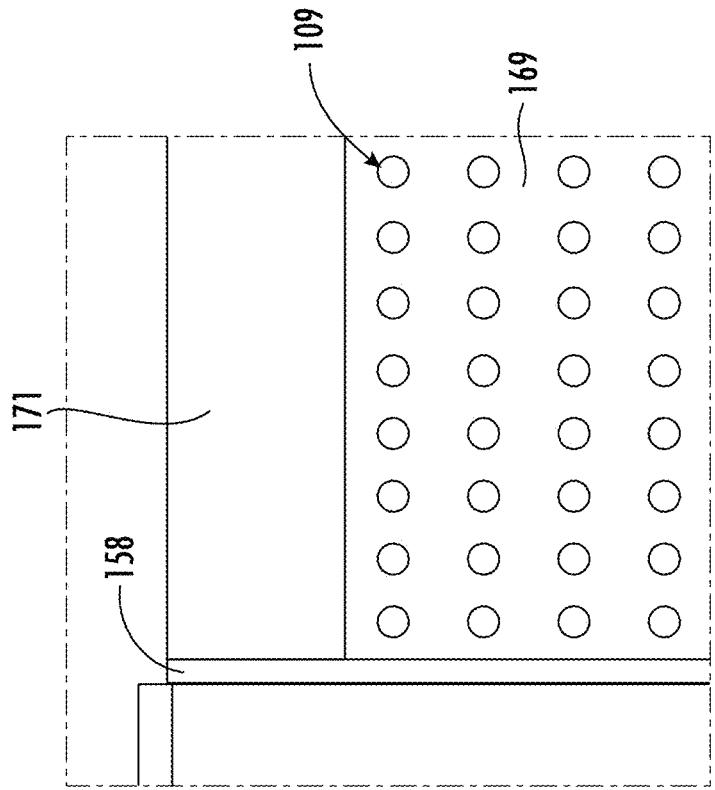
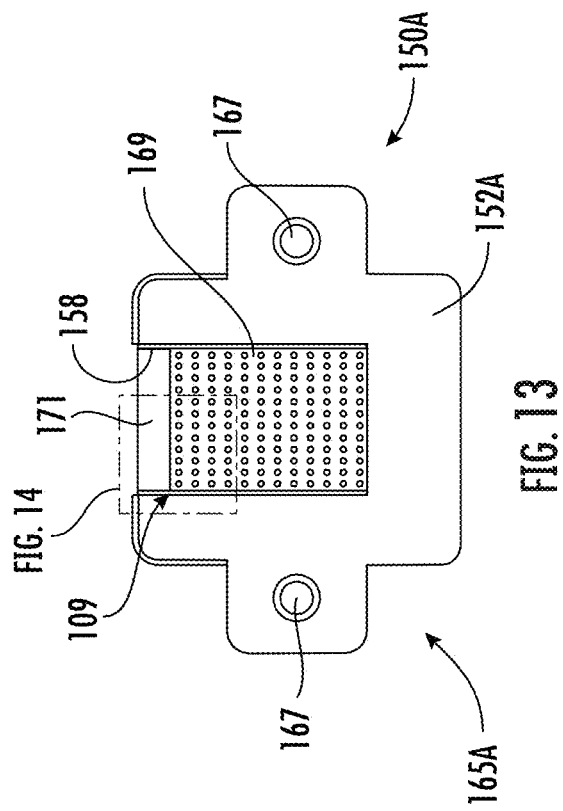

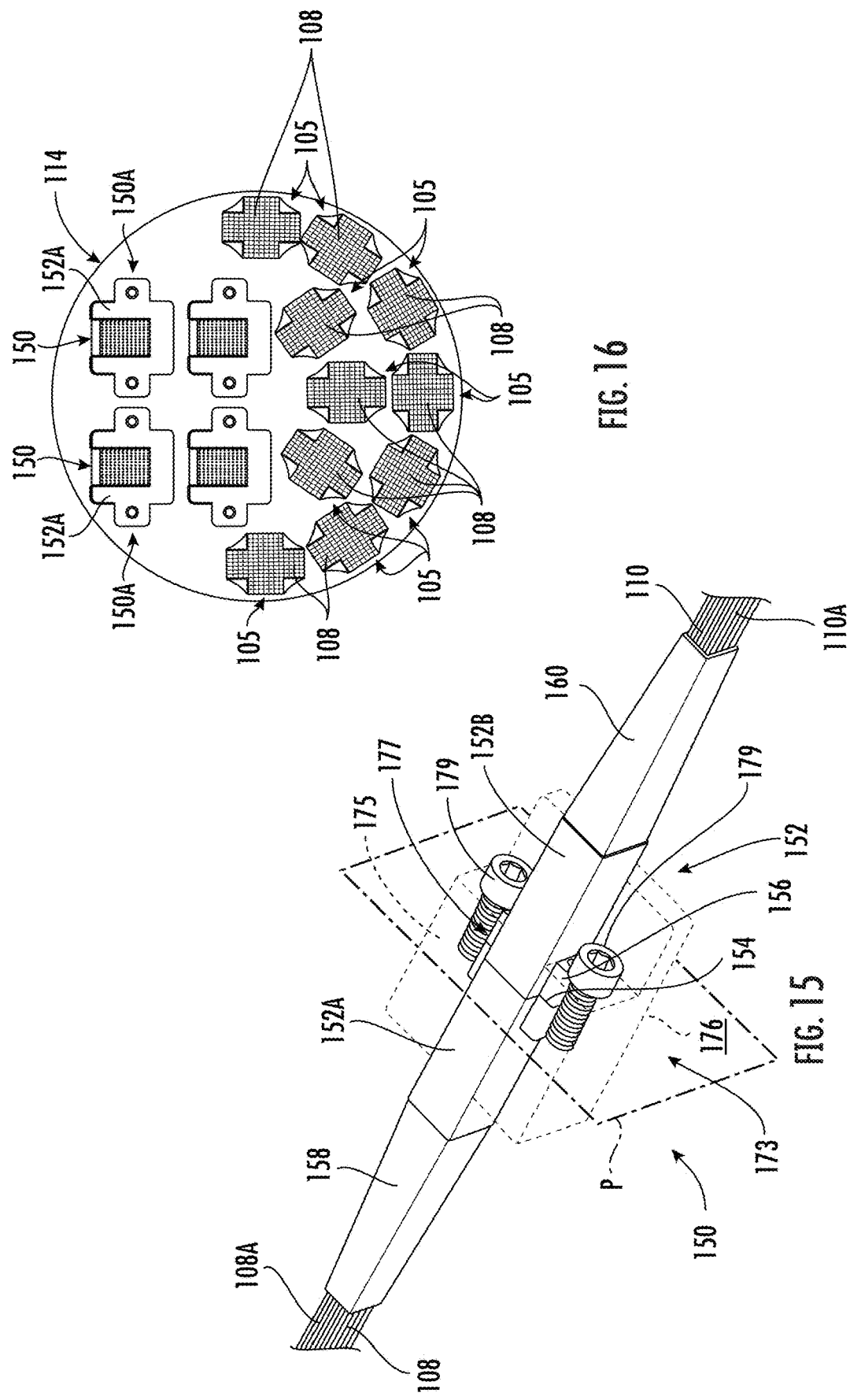

DETACHABLE CONNECTORS FOR FUSION SPLICE HIGH FIBER COUNT APPLICATIONS

PRIORITY APPLICATION

This application claims the benefit of priority of U.S. Provisional Application No. 63/225,606, filed on Jul. 26, 2021, the content of which is relied upon and incorporated herein by reference in its entirety.

FIELD OF THE DISCLOSURE

This disclosure relates generally to optical fiber cable assemblies and systems, and more particularly, to multi-fiber cable assemblies and systems.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

The rapid growth of hyperscale datacenters and 5G access networks have been driving the evolution of optical fiber cables toward increasing fiber count and density. Deployment of outside plant cables within datacenters has been a capital intensive infrastructure investment, and datacenter operators typically pre-install ducts to connect campus wide buildings. The ducts have various diameters ranging from 1 inch to 4 inches.

In conventional cable deployment, the cables are first installed through the ducts or micro-ducts. The cables are subsequently terminated in the field through fusion splicing inside a transition splice cabinet or a splice closure. Splicing in the field is a costly and time consuming process involving skilled field technicians. Field splicing also requires workspace that is sometimes unavailable.

Pre-terminated cables installed through the ducts are challenging since the connectors need to be packaged in a pulling grip that conforms to the cable diameter. The lack of high fiber count connectors coupled with the increase of fiber density exacerbates the problem. For example, a 6,912 fiber cable requires as many as 288 MTP ferrules if each ferrule terminates 24 fibers. An ideal connectivity between the furcated outside plant cable and the indoor cable would have a single or a small number of connections that only require a few matings over the lifetime. Unfortunately, commercially available highest fiber count single mode MPO ferrules are limited to 32 fibers. Moreover, the cost per fiber termination increases when moving to higher fiber count ferrules due to the reduced yield in both ferrule and the assembly process.

With existing ferrule termination technology plateauing at about 32 fiber per connector, there is a need for alternative high fiber count termination process that enable the connections of more than 144 fibers in a small footprint, while providing at least the same level of insertion loss and cost per fiber termination.

SUMMARY OF THE DISCLOSURE

The present disclosure relates to a fusion splice matched pair detachable connector for high fiber count applications where optical fiber alignment is maintained during processing of the detachable connector.

In one embodiment, an optical fiber cable assembly is provided. The optical fiber cable assembly comprising: a first plurality of optical fibers and a second plurality of optical fibers, wherein optical fibers of each of the first and second pluralities of optical fibers includes a pre-coated section and a stripped section; a plurality of fusion splices including a plurality of splice joints joining ends of the stripped sections of the first plurality of optical fibers with ends of the stripped sections of the second plurality of optical fibers to form a plurality of fusion spliced optical fibers; and a connector housing comprising a first housing, a second housing configured to couple to the first housing, and at least one wall that bounds an inner channel extending in a longitudinal direction of the housing; wherein the plurality of splice joints are at least partially positioned in the inner channel, and wherein at least a portion of the pre-coated sections of the first plurality of optical fibers and the second plurality of optical fibers are positioned within the inner channel of the housing; wherein the first housing and the second housing are coupled together along a plane aligned with contacting end faces of the first housing and the second housing, wherein the end faces of the first housing and the second housing form individual connectors.

In another embodiment, the plurality of splice joints are spaced apart from the plane by an offset distance. In another embodiment, the offset distance is between 1.5 mm and 9 mm from the plane. In another embodiment, the connector housing includes a potting adhesive in the inner channel and in between individual optical fibers of the first plurality of optical fibers and the second plurality of optical fibers. In another embodiment, the cured potting adhesive has a modulus of elasticity ranging between 0.1 GPa and 10 GPa. In another embodiment, the first plurality of optical fibers and the second plurality of optical fibers each comprise stacked optical fiber ribbons. In another embodiment, the stripped sections of the first plurality of optical fibers and the second plurality of optical fibers are each at least 2.5 mm in length measured from the plurality of splice joints. In another embodiment, the stripped sections of the first plurality of optical fibers and the second plurality of optical fibers are each about 10 mm in length measured from the plurality of splice joints. In another embodiment, the optical fiber cable assembly has an insertion loss of less than 0.5 dB at a reference wavelength of 1310 nm. In another embodiment, the optical fibers of the fusion spliced optical fibers have a core misalignment of less than 1.5 μm when the first housing and the second housing are coupled. In another embodiment, the plurality of fusion spliced optical fibers are substantially parallel with the longitudinal axis of the connector housing.

In one embodiment, an optical fiber cable assembly is provided. The optical fiber cable assembly comprising: a first fiber optic cable section comprising a first plurality of optical fibers, and a second fiber optic cable section comprising a second plurality of optical fibers, wherein optical fibers of each of the first and second pluralities of optical fibers includes a pre-coated section and a stripped section, wherein the first fiber optic cable section is an outdoor cable comprising a plurality of subunits, each subunit including the first plurality of optical fibers, and wherein the second fiber optic cable section is an indoor cable; a plurality of fusion splices including a plurality of splice joints joining ends of the stripped sections of the first plurality of optical fibers with ends of the stripped sections of the second plurality of optical fibers to form a plurality of fusion spliced optical fibers; and a connector housing comprising a first housing, a second housing configured to couple to the first housing, and at least one wall that bounds an inner channel extending in a longitudinal direction of the housing; wherein the plurality of splice joints are at least partially positioned in the inner channel, and wherein at least a portion of the pre-coated sections of the first plurality of optical fibers and the second plurality of optical fibers are positioned within the inner channel of the housing; wherein the first housing and the second housing are coupled together along a plane aligned with contacting end faces of the first housing and the second housing, wherein the end faces of the first housing and the second housing form individual connectors.

In another embodiment, the plurality of splice joints are spaced apart from the plane by an offset distance. In another embodiment, the offset distance is between 1.5 mm and 9 mm from the plane. In another embodiment, the connector housing includes a potting adhesive in the inner channel and in between individual optical fibers of the first plurality of optical fibers and the second plurality of optical fibers. In another embodiment, the connector housing comprises a first housing and a second housing defined by the plane, wherein the plane is angled relative to a longitudinal axis of the inner channel such that the first housing and the second housing are angled with respect to each other, the angle of the plane is less than or equal to about 90 degrees relative to the longitudinal axis. In another embodiment, the angle of the plane is about 8 degrees. In another embodiment, the stripped sections of the first plurality of optical fibers and the second plurality of optical fibers are each at least 2.5 mm in length measured from the plurality of splice joints. In another embodiment, the stripped sections of the first plurality of optical fibers and the second plurality of optical fibers are each about 10 mm in length measured from the plurality of splice joints. In another embodiment, the optical fiber cable assembly has an insertion loss of less than 0.5 dB at a reference wavelength of 1310 nm. In another embodiment, the optical fibers of the fusion spliced optical fibers have a core misalignment of less than 1.5 µm.

In one embodiment, a method of preparing an optical fiber cable assembly, the optical fiber cable assembly including a first fiber optic cable section comprising a first plurality of optical fibers and a second fiber optic cable section comprising a second plurality of optical fibers is provided. The method comprising: extracting the first plurality of optical fibers and the second plurality of optical fibers from the first fiber optic cable section and the second fiber optic cable section respectively; stripping a portion of the first plurality of optical fibers and a portion of the second plurality of optical fibers such that each optical fiber of the first and second pluralities of optical fibers includes a pre-coated section and a stripped section; splicing ends of the stripped sections of the first plurality of optical fibers with ends of the stripped sections of the second plurality of optical fibers to form a plurality of splice joints and a plurality of fusion spliced optical fibers; placing the plurality of fusion spliced optical fibers in a connector housing; and dicing the plurality of fusion spliced optical fibers and the connector housing along a plane, wherein the connector housing is diced into a first housing and a second housing that are positioned and oriented such that the first housing and the second housing face each other when the first housing and the second housing are joined.

In another embodiment, the method further comprising: coating an end face of at least one of the first housing and the second housing with optical index matching gel or film. In another embodiment, the plane is spaced apart from the splice joints of the plurality of fusion spliced optical fibers by an offset distance ranging between 1.5 mm and 9 mm. In another embodiment, the method further comprising: potting the plurality of fusion spliced optical fibers in the connector housing with a potting adhesive. In another embodiment, the plane dices unstripped portions of the fusion spliced optical fibers.

Additional features will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

FIG. 1 is a side perspective view of a cable assembly in accordance with the present disclosure;

FIG. 2 is a cross-sectional view of an outdoor cable shown in the cable assembly of FIG. 1;

FIG. 3 is a perspective view of a connector assembly in accordance with the present disclosure;

FIG. 4 is a top view of the connector assembly of FIG. 3;

FIG. 5 is a side view of the connector assembly of FIG. 3;

FIG. 6 is a schematic of a dicing process applied onto the connector assembly of FIG. 3;

FIG. 7 is a perspective view of an alternate embodiment of the connector assembly of FIG. 3;

FIG. 9 is a perspective view of the connector assembly of FIG. 3 with boot structures added onto the connector assembly in accordance with the present disclosure;

FIGS. 10 and 11 are perspective views of the connector assembly of FIG. 9 after the connector assembly has been diced;

FIG. 12 is a perspective view of the connector assembly of FIGS. 10 and 11 with the addition of guide pins to facilitate coupling between the halves of the connector assembly in accordance with the present disclosure;

FIG. 13 is a front view of a half of the connector assembly of FIG. 12 illustrating an end face of the connector assembly in accordance with the present disclosure;

FIG. 14 is an enlarged front view of a portion of the connector assembly shown in FIG. 13;

FIG. 15 is a perspective view of the connector assembly of FIGS. 10-12 in an assembled configuration in accordance with the present disclosure; and FIG. 16 is a cross sectional view of a cable assembly housing the connector assembly of FIG. 15.

DETAILED DESCRIPTION

Figure 7A:
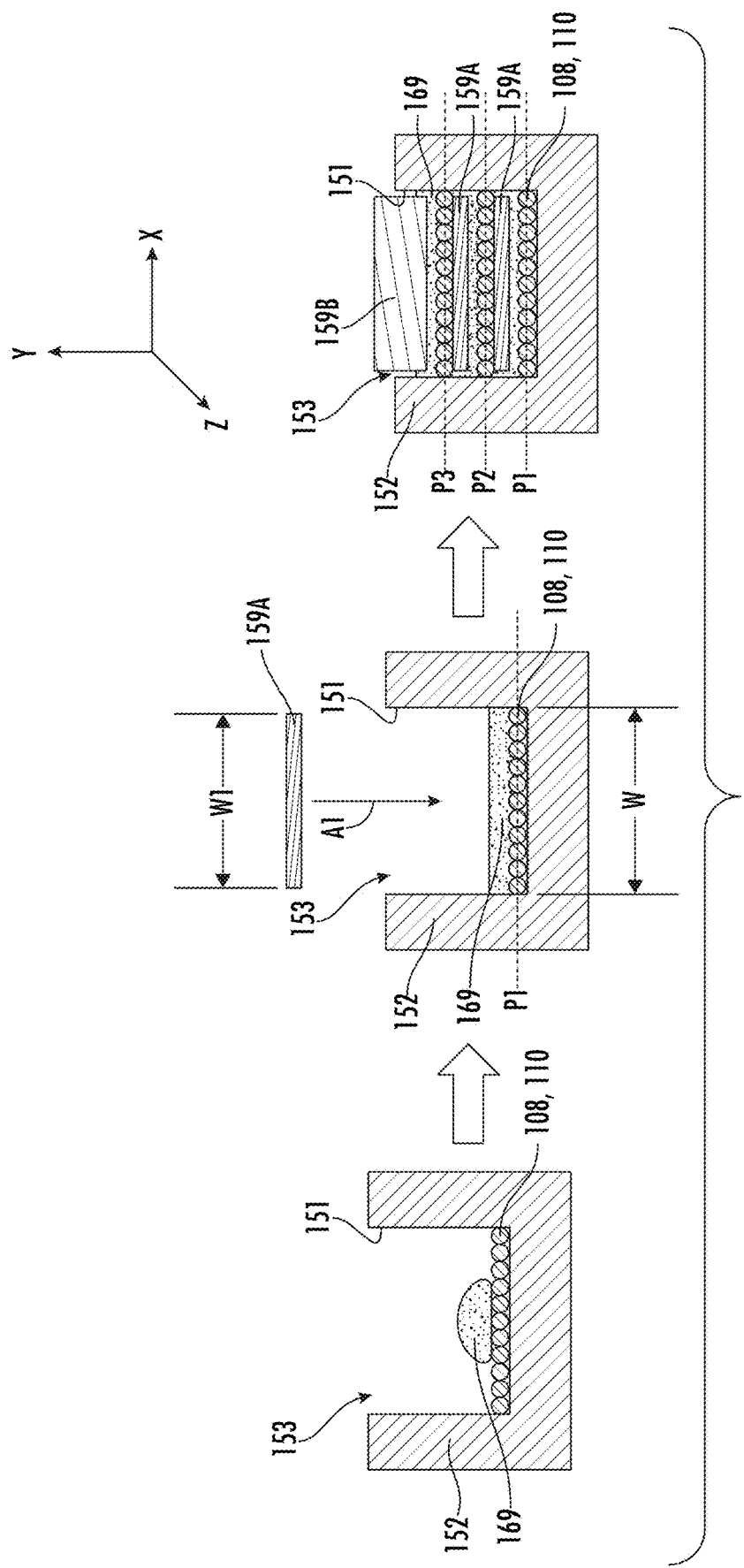
FIGS. 7A-7C are schematics illustrating methods of assembling the connector assembly in accordance with the present disclosure.

Various embodiments will be further clarified by examples in the description below. In general, the present disclosure relates to a fusion splice matched pair detachable connector for high fiber count applications where optical fiber alignment is maintained during processing of the detachable connector.

In this disclosure, the language "fusion spliced optical fiber" refers to two optical fibers that have been fusion spliced together to form a permanent, optical link incorporating the two optical fibers. The singular noun "fusion spliced optical fiber" is used even though two optical fibers are initially present because, after fusion splicing, the resulting optical link is intended to function like a continuous optical fiber (even though there may be some attenuation resulting from the fusion splice joint (discussed below)). Using the singular form also facilitates discussions involving groups of these fusion spliced optical fibers, as will be apparent. A fusion spliced optical fiber may desirably include a polymeric overcoating over the fusion splice joint as well as over stripped portions of optical fibers proximate to the fusion splice joint.

Referring first to FIG. 1, a cable assembly 100 is shown. Cable assembly 100 includes an outdoor cable 104 (e.g., a high fiber count cable) and an indoor cable 106 (e.g., a lower fiber count cable with a flame retardant jacket) that mate together as discussed herein. Outdoor cable 104 is fed through a duct 102 of a building (e.g., hyperscale datacenter, etc.) and includes multiple subunits 105. Subunits 105 comprise optical fibers 108 or optical fiber ribbons 108. As used herein, "optical fibers" refer to either embodiment of singular, loose optical fibers or ribbonized optical fibers or stacked ribbonized optical fibers. Optical fibers 108 of outdoor cable 104 are configured to connect to optical fibers 110 of indoor cable 106 by a connector assembly 150 as discussed in greater detail herein. In some embodiments, the connection between optical fibers 108 and optical fibers 110 can comprise greater than 144 optical fibers, which are housed in connector assembly 150. Outdoor cable 104 is scalable to accommodate high optical fiber counts such as 6,912 optical fibers depending on the optical fiber diameters. In other embodiments, connector assembly 150 can be used with only indoor cables 106 or only outdoor cables 104.

Optical fibers 108, 110 may comprise different fiber types, different coating diameters, different ribbon formats, or a different combination of the above. In some embodiments, fiber types include standard single mode fibers or highly bend insensitive fibers. The fiber coating diameters include 250 μm, 200 μm, 180 μm, 160 μm and lower fiber coating diameters. The ribbon formats include fully encapsulated ribbon and rollable ribbon. Such combinations offer flexibility that can be tailored to different applications as opposed to the prior art where all the fiber attributes must be identical on both sides of the connection.

Referring briefly to FIG. 2, a cross-sectional view of an embodiment of outdoor cable 104 is shown in accordance with aspects of the present disclosure. As shown, outdoor cable 104 has 12 routable subunits 105; however, it is contemplated that in alternate embodiments, alternate number of subunits 105 may be included in outdoor cable 104. Each of the subunits 105 includes optical fibers 108 loosely disposed within the subunit 105 (e.g., in an essentially parallel array). In certain embodiments, the optical fibers 108 may be coated with a thin film of powder (e.g., chalk, talc, etc.) which forms a separation layer that prevents the fibers from sticking to the molten sheath material during extrusion.

Referring back to FIG. 1, indoor cables 106 are generally housed within an interior of a building (e.g., hyperscale datacenter, etc.) and comprise an outer jacket 112 from which optical fibers 110 protrude. Each indoor cable 106 requires a smaller number of matched connections with outdoor cable 104. For example, a 288 fiber indoor cable 106 and a 288 fiber subunit 105 from outdoor cable 104 requires two 144 fiber matched connectors 150A, 150B (FIG. 11). As shown in FIG. 1, connector assemblies 150 are staggered so that cable assembly 100 can be enclosed in a pulling grip with a size close to the outer diameter of outside cable 104 for installation through duct 102.

To connect optical fibers 108 to optical fibers 110, fusion splicing may be used. In certain embodiments, pre-coated (i.e., acrylate coated) optical fibers 108, 110 subject to being fusion bonded and overcoated (or encapsulated) according to methods disclosed herein are prepared for fusion bonding (e.g., by stripping ends thereof) utilizing non-contact fiber stripping methods and/or apparatuses, such as those disclosed in U.S. Pat. No. 9,167,626 B2 ("the '626 Patent"), which is hereby incorporated by reference. Briefly, the '626 Patent discloses use of a heater configured for heating a heating region to a temperature above a thermal decomposition temperature of at least one coating 108A, 110A of an optical fiber 108, 110, respectively, a securing mechanism for securely positioning a lengthwise section of the optical fiber 108, 110 in the heating region, and a controller operatively associated with the heater and configured to deactivate the heater no later than immediately after removal of the at least one coating 108A, 110A from the optical fiber 108, 110. Thermal decomposition of at least one coating 108A, 110A of an optical fiber 108, 110 reduces or minimizes formation of flaws in optical fibers 108, 110 that may be generated by mechanical stripping methods and that can reduce their tensile strength.

In certain embodiments, unjacketed optical fibers emanating from the same jacket 112 may be initially loose, but subsequently ribbonized to provide consistent spacing between fibers 108, 110 to facilitate utilization of a mass fusion splicing process for forming multiple splice joints 115 (FIG. 5) between multiple pairs of optical fibers 108, 110 in a substantially simultaneous manner. To ribbonize an optical fiber 108, 110, optical fibers 108, 110 of an unjacketed/stripped sections 109, 111 may be contacted with at least one polymeric material (e.g., thermoplastic hotmelt material) in a flowable state, and the at least one polymeric material may be solidified. When optical fiber ribbons 108, 110 are used, mass fusion splicing may be performed between ends of optical fibers 108 of a first optical fiber ribbon 108 and ends of optical fibers 110 of a second optical fiber ribbon 110.

Optical fibers of a first plurality of optical fibers 108 and optical fibers of a second plurality of optical fibers 110 to be fusion bonded may be arranged in first and second conventional fiber sorting fixtures, respectively, during stripping and/or fusion bonding steps. A typical fiber sorting fixture includes a slot having an opening dimension (e.g., height) that closely matches a corresponding dimension of unbuffered, coated optical fibers to maintain portions of the optical fibers proximate to ends to be stripped (and subsequently fusion spliced) in fixed, substantially parallel positions embodying a one-dimensional array. In certain embodiments, coated optical fibers having outer diameters of either 200 µm or 250 µm may laterally abut one another in a fiber sorting fixture, such that cores of adjacent optical fibers are also spaced either 200 µm or 250 µm apart. After stripping of acrylate coating material from end sections (to form stripped sections 109, 111) of the optical fibers, the remaining (bare glass) cladding and core portions are in a non-contacting (and non-crossing) relationship, and bare glass ends of the optical fibers may be fusion bonded using conventional fusion bonding method steps known to those skilled in the art. Mass fusion bonding may be used in any embodiments disclosed herein. Variations of the techniques disclosed in the '626 Patent are disclosed in U.S. Pat. Nos. 10,018,782 and 9,604,261, the disclosures of which are also hereby incorporated by reference herein. Non-contact stripping methods using lasers or hot gases are also possible in certain embodiments. The methods described above result in the formation of fusion spliced optical fibers 125 as discussed herein.

Referring now to FIGS. 3 and 4, fusion spliced optical fibers 125 are placed in a connector housing 152 to form a connector assembly 150. Connector housing 152 comprises at least one wall 151 to define an inner channel 153 along a longitudinal axis L of connector housing 152. In some embodiments, connector housing 152 is U-shaped. However, it is within the scope of the present disclosure that alternate shapes of connector housing 152 may be used. For example, connector housing 152 may include additional channels to house a greater number of optical fibers (e.g., more than 144 optical fibers such as 288 fiber or 432 fiber matched connector pairs). Inner channel 153 is configured to house fusion spliced optical fibers 125, and in some embodiments, each optical fiber 108, 110 of fusion spliced optical fiber 125 is substantially parallel to longitudinal axis L of connector housing 152. As used herein, "substantially parallel" refers to parallel axes to within 0.15° relative to each other. Inner channel 153 houses splice joint(s) 115 of fusion spliced optical fibers 125, stripped sections 109, 111 of optical fibers 108, 110, respectively, and at least a portion of coated sections or coatings 108A, 110A of optical fibers 108, 110, respectively. In some embodiments, stripped sections 109, 111 are each about 10 mm in length as measured from splice joint 115. In some embodiments, fusion spliced optical fibers 125 are placed within inner channel 153 of connector housing 152 such that splice joint(s) 115 are in line with or coplanar with a dicing plane P/center mark 154 as discussed herein and shown in FIGS. 3-6. In some embodiments, fusion spliced optical fibers 125 are placed within inner channel 153 of connector housing 152 such that splice joint(s) 115 are spaced apart from or non-coplanar with a dicing plane P/center mark 154 by an offset distance D1 as discussed herein as shown in FIGS. 7 and 8. In some embodiments, the offset distance D1 between splice joint(s) 115 and dicing plane P ranges between 1.5 mm and 9 mm, between 1.5 mm and 6 mm, or between 3 mm and 6 mm from an intersection point of dicing plane P and longitudinal axis L.

Referring briefly to FIGS. 13 and 14, inner channel 153 also receives a potting adhesive 169 configured to fill in the spaces between optical fibers 108, 110 of fusion spliced optical fibers 125 and to hold optical fibers 108, 110 of fusion spliced optical fiber 125 in place to maintain alignment between connectors 150A, 150B and thereby, yielding improved insertion loss properties as discussed herein. In some embodiments, a lid 159 (FIG. 7) is applied such that potting adhesive is encapsulated within connector housing 152. In some embodiments, lid 159 is made of glass. However, it is within the scope of the present disclosure that alternate materials may be used for lid 159.

In some embodiments, cured potting adhesive 169 has a modulus of elasticity ranging between 0.1 GPa and 10 GPa, between 1 GPa and 5 GPa, or between 1 GPa and 3 GPa. As used herein, "cured potting adhesive" refers to when potting adhesive 169 reaches full bonding strength. In some embodiments, potting adhesive 169 has a shrinkage ratio (volume reduction after curing) ranging between 0.1% and 5%, between 0.5% and 3%, or between 0.5% and 2%. In some embodiments, potting adhesive 169 has a coefficient of thermal expansion ranging between $10 \times 10^{-6}/°$ C. and $200 \times 10^{-6}/°$ C. between $20 \times 10^{-6}/°$ C. and $150 \times 10^{-6}/°$ C., or between $20 \times 10^{-6}/°$ C. and $100 \times 10^{-6}/°$ C.

Figure 7B:
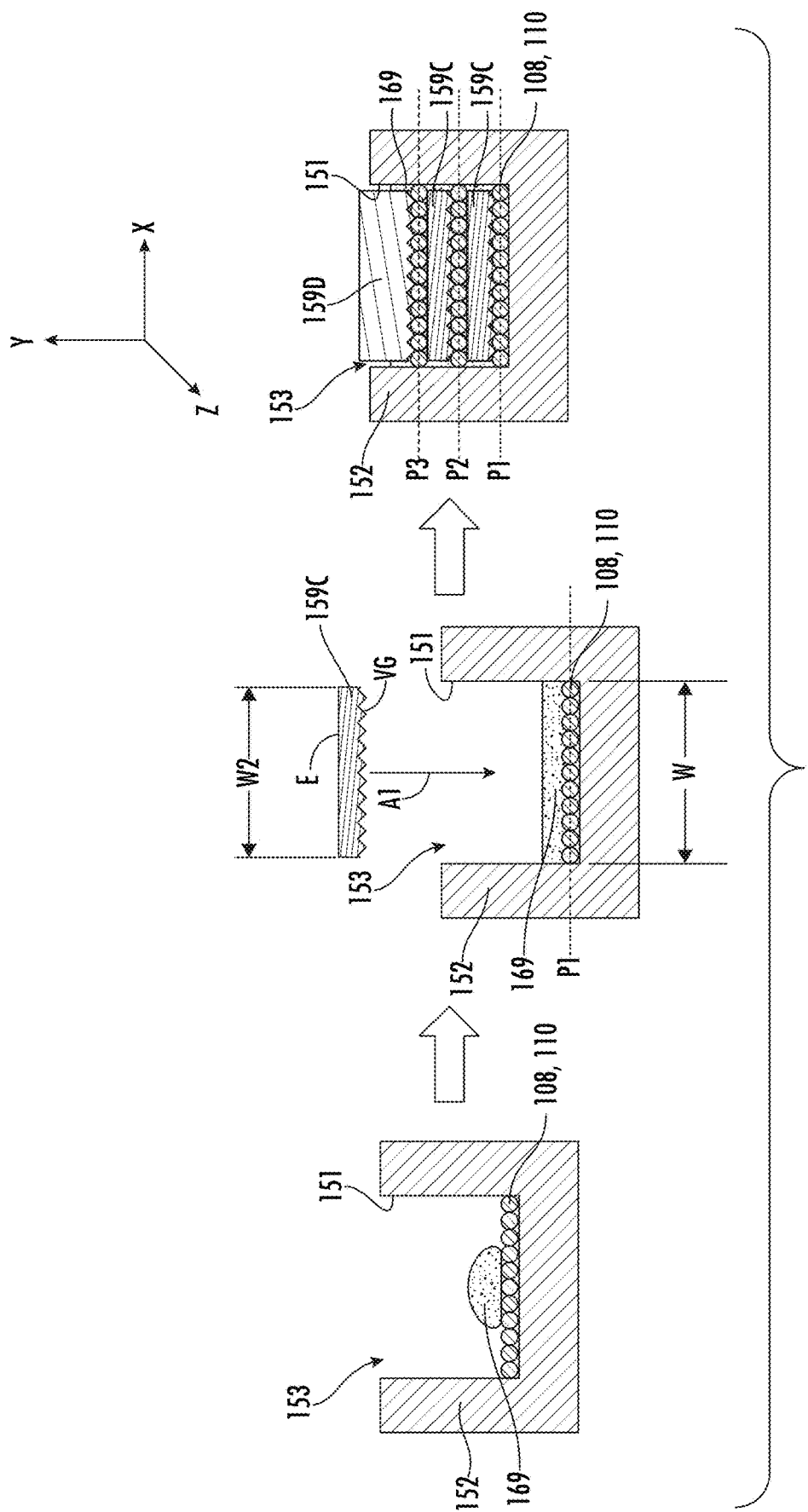
Figure 7C:
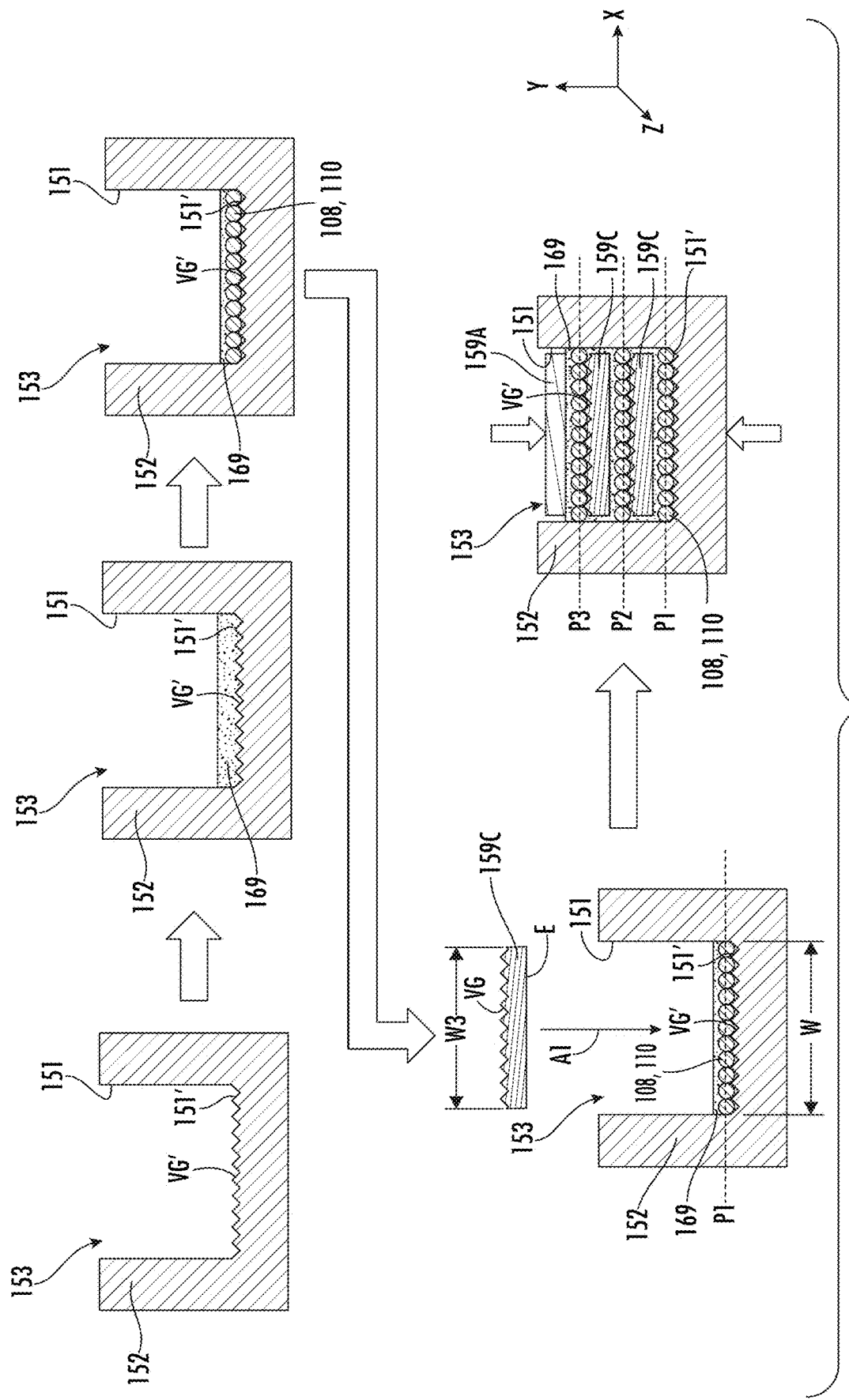
Figure 8:
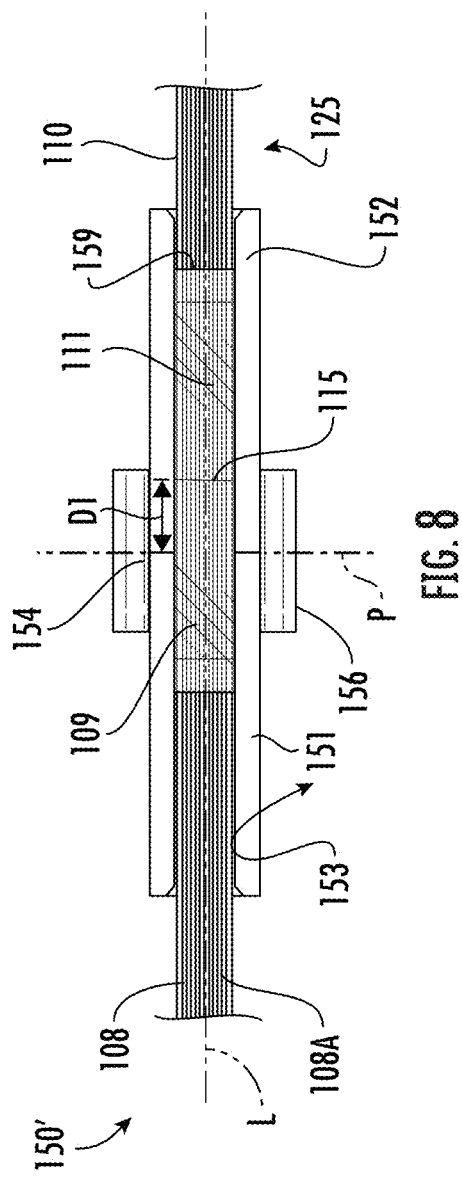
FIG. 8 is a top view of the alternate connector assembly of FIG. 7.

Referring briefly to FIGS. 7A-7C, various methods of inserting optical fibers 108, 110 with potting adhesive 169 within connector 152 are shown and described below. In particular, in some embodiments, potting adhesive 169 and optical fibers 108, 110 are applied in layers within inner channel 153.

Referring first to FIG. 7A, when assembling connectors 150A, 150B, a first layer of optical fibers 108, 110 are laid within inner channel 153. Then, potting adhesive 169 is applied into inner channel 153 onto the first layer of optical fibers 108, 110. An alignment plate 159A is then moved into and placed within inner channel 153 along direction A1 to apply a downward force (i.e., −y direction as shown in the Cartesian coordinate system in the Figure) onto potting adhesive 169 such that potting adhesive 169 is dispersed length-wise (z direction) and width-wise (x direction) within inner channel 153 and between individual optical fibers 108, 110 inserted into inner channel 153. As shown, alignment plate 159A has a width W1 that is less than width W of inner channel 153. This difference in width enables movement of alignment plate 159A within inner channel 153 and enables potting adhesive to move upwards (+y direction) along an edge of the alignment plate 159A to fill in the width difference between alignment plate 159A and inner channel 153 (defined by wall 151). Advantageously, the insertion of alignment plate 159A within inner channel 153 and placement on top of optical fibers 108, 110 and potting adhesive 169 limits movement of optical fibers 108, 110 in the y-direction and maintains alignment among the layer of the optical fibers 108, 110 within a singular plane P1.

This process comprising of inserting a layer of optical fibers 108, 110; inserting potting adhesive 169 on top of the layer of the optical fibers 108, 110; and inserting alignment plate 159A to compress and spread the potting adhesive 169 within inner channel 153 and between individual optical fibers 108, 110 is repeated until all the layers of optical fibers 108, 110 are inserted into inner channel 153 and are encompassed by at least a layer of potting adhesive 169. As mentioned above, the application of alignment plates 159A (and alignment plate 159B described below) onto optical fibers 108, 110 limits movement of layers of optical fibers 108, 110 in the y-direction and maintains alignment among the layers of optical fibers 108, 110 within planes P1, P2, and P3 as shown.

As shown in FIG. 7A, a larger alignment plate 159B is then inserted into inner channel 153 onto the top-most layer of potting adhesive 169. The larger alignment plate 159B protrudes outwardly of the wall 151 of connector housing 152 (i.e., the larger alignment plate 159B has a top edge that is higher in the y direction than a top surface of connector housing 152 when seated on the optical fibers 108, 110). Advantageously, such a height difference facilitates clamping of the connector housing 152 and internal components (i.e., optical fibers 108, 110 and potting adhesive 169) to maintain alignment within connector 152 during cure of potting adhesive 169.

In some embodiments, the above-described process begins with insertion of a layer of potting adhesive 169 that is followed by the sequential addition of optical fibers 108, 110 and subsequent potting adhesive 169 and alignment plates 159A, 159B as described above.

Referring now to FIG. 7B, an alignment block 159C is used during the assembly process of optical fibers 108, 110 and potting adhesive 169 described above. Alignment block 159C is used to press onto potting adhesive 169 while also maintaining alignment of optical fibers 108, 110 as described below. As shown, in FIG. 7B, alignment block 159C has a flat edge E and a plurality of V-grooves VG opposite flat edge E. V-grooves VG are configured to receive optical fibers 108, 110 as shown, and the V-grooves VG are configured to push potting adhesive 169 between optical fibers 108, 110 and within inner channel 153.

With alignment plate 159C, the assembly process of optical fibers 108, 110 and potting adhesive 169 within inner channel 153 is substantially the same as described above. First, a layer of optical fibers 108, 110 are positioned within inner channel 153 and a layer of potting adhesive 169 is applied onto the layer of optical fibers 108, 110. Then, alignment plate 159C is moved along direction A1 (–y direction of the Cartesian coordinate system provided in the Figure) and positioned on the layer of potting adhesive 169 and optical fibers 108, 110 such that potting adhesive 169 is dispersed within inner channel 153 (both length-wise and width-wise) and optical fibers 108, 110 are positioned within V-grooves VG. By positioning optical fibers 108, 110 within V-grooves VG, optical fibers 108, 110 have three points of contact within inner channel 153 and are thereby, held in place such that there is limited movement in at least the x and y directions within inner channel 153. This maintains the spacing and alignment of optical fibers 108, 110 within connector 152 and can reduce potential losses (e.g., macrobend, insertion, etc.) stemming from optical fiber misalignment.

This process comprising of inserting a layer of optical fibers 108, 110; inserting potting adhesive 169 on top of the layer of the optical fibers 108, 110; and inserting alignment plate 159C to compress and spread the potting adhesive 169 within inner channel 153 (and between individual optical fibers 108, 110) and position optical fibers 108, 110 within V-grooves VG is repeated until all the layers of optical fibers 108, 110 are inserted into inner channel 153 and are encompassed by at least a layer of potting adhesive 169. As mentioned above, similar to alignment plates 159A, 159B, the application of alignment plates 159C (and alignment plate 159D described below) onto optical fibers 108, 110 limits movement of layers of optical fibers 108, 110 in the x and y-directions and maintains alignment among the layers of optical fibers 108, 110 within planes P1, P2, and P3 as shown.

Similar to alignment plate 159B described above, alignment block 159D when seated on optical fibers 108, 110 and potting adhesive 169 has flat edge E positioned above a top surface of connector housing 152. Advantageously, such an orientation facilitates clamping of the connector housing 152 and internal components (i.e., optical fibers 108, 110 and potting adhesive 169) to hold the components in place during cure of potting adhesive 169.

Referring now to FIG. 7C, an alternate connector 152 is used in connection with the described assembly process. In particular, as shown, connector 152 has an inner channel 153 defined by at least one wall 151 where the at least one wall 151 has a base wall 151' with V-grooves VG'. With this connector 152, the potting adhesive 169 is first applied within inner channel 153. Then, a layer of optical fibers 108, 110 are applied such that optical fibers 108, 110 are positioned within V-grooves VG' of inner channel 153. Then, alignment block 159C is moved along direction A1 (–y direction as defined by the Cartesian coordinate system shown in the Figure) into inner channel 153 such that flat edge E is applied onto the potting adhesive 169 as shown. This configuration applies three points of contact onto the optical fibers 108, 110 to limit movement as described above. Then, the next layer of optical fibers 108, 110 are inserted into inner channel 153 and into V-grooves VG of alignment block 159C, which is then followed by a layer of potting adhesive 169. Another alignment block 159C is applied onto the layer of potting adhesive 169 and optical fibers 108, 110 with flat edge E applied onto optical fibers 108, 110. This process continues until the last layer of optical fibers 108, 110 and potting adhesive 169 are applied onto V-grooves VG of the corresponding alignment block 159C. Then, alignment plate 159A as described above is applied onto the optical fibers 108, 110 and potting adhesive 169, whereby alignment plate 159A is used for clamping and curing of potting adhesive 169 within connector 152. In some embodiments, alignment plate 159B may be applied onto the optical fibers 108, 110 and potting adhesive 169.

As mentioned previously, the configuration of FIG. 7C limits movement of layers of optical fibers 108, 110 in the x and y-directions due to the use of alignment plates 159C and 159A. This maintains alignment among the layers of optical fibers 108, 110 within planes P1, P2, and P3 as shown.

Referring back to FIGS. 3 and 4, at least one wall 151 includes a center mark 154. Center mark 154 identifies approximately where connector housing 152 is to be diced to form connectors 150A, 150B. That is, center mark 154 defines a dicing plane P (that is coplanar with center mark 154) through which connector housing 152 and housed fusion spliced optical fibers 125 are diced as shown. In some embodiments, dicing plane P is perpendicular to longitudinal axis L. In some embodiments, dicing plane P is angled with respect to longitudinal axis L to enhance return loss performance of connector assembly 150. In some embodiments, dicing plane P has an angle θ ranging between 1° and 8°, between 2° and 7°, or between 3° and 6° with respect to longitudinal axis L. In some embodiments, dicing plane P has an angle θ of about 8° with respect to longitudinal axis L. In some embodiments, when dicing plane P is angled, splice joints 115 of fusion splice optical fibers 125 are staggered in accordance with the angle of dicing plane P relative to longitudinal axis L.

With continued reference to FIGS. 3 and 4, connector housing 152 also includes outer members 156 integrally formed with connector housing 152. In some embodiments, outer members 156 are coupled to wall 151 of connector housing 152. Outer members 156 are configured to provide alignment and fit between connectors 150A, 150B via recesses 157 that are provided therethrough and are parallel with longitudinal axis L of connector housing 152 as discussed herein.

To form connectors 150A, 150B from connector assembly 150, connector assembly 150 is diced along dicing plane P. Referring first to FIGS. 3-7, a first embodiment of connector assembly 150 is shown. As shown and mentioned previously, splice joints 115 of fusion spliced optical fibers 125 are in line with or coplanar with center mark 154 or dicing plane P, respectively. Once assembled, connector assembly 150 is diced with a cutting tool (e.g., diamond wire dicing saw, etc.) to form connectors 150A, 150B. At a splice joint 115, the mode field diameter of fusion spliced optical fiber 125 is greater by about 5% in some embodiments. As shown in FIG. 6, splice joint 115 includes transition zones 117, 119 of optical fibers 108, 110, respectively, on either side of splice joint 115. In some embodiments, transition zones 117, 119 extend over a length of about 0.5 mm. As is also shown in FIG. 6, when dicing along the same plane as splice joints 115, a kerf region 120 is removed by the cutting tool. In some embodiments, kerf region 120 is less than about 0.2 mm of material loss during dicing. Advantageously, transition zones 117, 119 and their corresponding increased mode field diameters enable retention of fusion spliced optical fiber 125 properties (e.g., insertion loss properties) with reduced loss sensitivity to lateral misalignment of optical fibers 108, 110. When connector assembly 150 is diced, core positions of optical fibers 108, 110 of fusion spliced optical fibers 125 are substantially unchanged. In some embodiments, core misalignment between optical fibers 108, 110 is less than 1.5 μm. In some embodiments, connector assembly 150 comprising connectors 150A, 150B has a maximum insertion loss of less than 0.5 dB at a wavelength of 1310 nm.

In a second embodiment, with reference to FIGS. 7 and 8, splice joints 115 of fusion spliced optical fibers 125 are spaced apart from or non-coplanar with center mark 154 or dicing plane P, respectively, by offset distance D1. As mentioned previously, the offset distance D1 between splice joint(s) 115 and dicing plane P ranges between 1.5 mm and 9 mm in some embodiments. The spacing or offset distance D1 is intended to avoid dicing weaker area near splice joint 115. In some embodiments, the weaker areas near splice joint 115 are between about 0.5 mm and 1.5 mm from splice joint 115. Once assembled, connector assembly 150 is diced with a cutting tool (e.g., diamond wire dicing saw, etc.) to form connectors 150A, 150B. By spacing splice joints 115 from dicing plane P by offset distance D1, the dicing process does not sever splice joints 115. Moreover, the offset distance D1 allows attenuation of high order modes excited by small core misalignment and reduces resulting multipath interference. Also, this embodiment does not require precision alignment or stagger in the axial direction of splice joints 115 of fusion spliced optical fibers 125 for the angled dicing process described above. As mentioned previously, when connector assembly 150 is diced, core positions of optical fibers 108, 110 of fusion spliced optical fibers 125 are substantially unchanged. In some embodiments, core misalignment between optical fibers 108, 110 is less than 1.5 μm. In some embodiments, connector assembly 150 comprising connectors 150A, 150B has a maximum insertion loss of less than 0.5 dB at a wavelength of 1310 nm.

Connectors 150A, 150B have corresponding end faces 165A, 165B that may not require polishing due to the aforementioned low loss of kerf region 120. Referring briefly to FIG. 13, end face 165A is provided where an index matching layer 171 is provided thereto. Index matching layer 171 fills the gap between the fibers when connectors 150A, 150B are mated together without requiring physical contact and provides for transmission of light between optical fibers 108, 110 of connectors 150A, 150B absent physical contact when connectors 150A, 150B are coupled together. In some embodiments, index matching layer 171 is a thin film having a thickness of about 10 μm. In an alternate embodiment, index matching layer 171 is an index matching gel that is applied onto connector end face 165A. In some embodiments, index matching layer 171 is applied onto one of connector end faces 165A, 165B. In other embodiments, index matching layer 171 is a dry film applied onto both connector end faces 165A, 165B. In some embodiments, connectors 150A, 150B have identification tags such as a bar code, QR code, or RFID markings to prevent mating of mismatched connectors. In some embodiments, laser marking can be used to imprint a marking on a bottom surface of connectors 150A, 150B such that the patterns on both connectors 150A, 150B must match before connecting connectors 150A, 150B. In some embodiments, complementary mechanical features can be attached to bottom surfaces of connectors 150A, 150B to form keyed surfaces such that the keyed surfaces must match before connecting connectors 150A, 150B.

As shown in at least FIGS. 10-12, each connector 150A, 150B includes strain relief boots 158, 160 respectively, on either side of connector housing 152 to provide mechanical strain relief to connector assembly 150. In some embodiments, strain relief boots 158, 160 may be over molded onto optical fibers 108, 110, respectively, using softer polymer materials. These materials may include polyurethane or low-pressure molding compounds.

After connector assembly 150 is diced into connectors 150A, 150B, outer members 156 have guide pins 167 attached to end faces 165A of connector 150A as shown in FIG. 13 where guide pins 167 are sized and configured to be received into recesses 157 in outer members 156 of connector 150B to couple connectors 150A, 150B together and to promote and retain alignment between connectors 150A, 150B. In some embodiments, recesses 157 in outer members 156 of connector 150B are machined to be less than the outer diameter of guide pins 167 by less than 10 μm to provide an interference fit or press fit when coupling connectors 150A, 150B via guide pins 167 and corresponding recesses 157. In an alternate embodiment, at least one guide pin 167 can be pressed onto a complementary guide hole/recess 157 of each connector. While guide pins 167 are shown, it is within the scope of the present disclosure that alternate suitable fastening means may be used to couple connectors 150A, 150B together. In some embodiments, when connectors 150A, 150B are coupled together a sealant (e.g., silicone) may be applied onto connector housing 152 of connector assembly 150 to prevent dust or moisture from entering connector housing 152.

While guide pins 167 can provide sufficient retention force to retain the connection between connectors 150A, 150B, additional stability to connector assembly 150 is provided via an external housing 173 shown in FIG. 15 in dashed lines. External housing 173 includes a cradle 175 having a slot 177 into which connectors 150A, 150B slide. In addition, outer members 156 are pressed together via fasteners 179, and bottom 176 of cradle 175 covers lid 159 and connectors 150A, 150B.

Referring now to FIG. 16, a pulling grip 114 is shown where pulling grip 114 has substantially the same outer diameter as outdoor cable 104. As shown, pulling grip 114 includes four connector assemblies 150 and ten remaining subunits 105, the latter of which will be terminated with connectors at additional staggered locations along the length of outdoor cable 104.

Persons skilled in optical connectivity will appreciate additional variations and modifications of the elements disclosed herein. Such persons will also appreciate variations and modifications of the methods involving the elements disclosed herein. For example, although embodiments are described above where less than all of the bonding agent is melted and solidified when forming a fiber optic connector sub-assembly, in alternative embodiments all or substantially all of the bonding agent may be melted and solidified. In addition, skilled persons will appreciate alternatives where some of the steps described above are performed in different orders. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. An optical fiber cable assembly comprising:
a first plurality of optical fibers and a second plurality of optical fibers, wherein optical fibers of each of the first and second pluralities of optical fibers includes a pre-coated section and a stripped section;
wherein the first plurality of optical fibers and the second plurality of optical fibers each comprise stacked optical fiber ribbons;
a plurality of fusion splices including a plurality of splice joints joining ends of the stripped sections of the first plurality of optical fibers with ends of the stripped sections of the second plurality of optical fibers to form a plurality of fusion spliced optical fibers; and
a connector housing comprising a first housing, a second housing configured to couple to the first housing, and at least one wall that bounds an inner channel extending in a longitudinal direction of the housing;
wherein the plurality of splice joints are at least partially positioned in the inner channel, and wherein at least a portion of the pre-coated sections of the first plurality of optical fibers and the second plurality of optical fibers are positioned within the inner channel of the housing;
wherein the first housing and the second housing are coupled together along a plane aligned with contacting end faces of the first housing and the second housing, wherein the end faces of the first housing and the second housing form individual connectors.

2. The optical fiber cable assembly of claim 1, wherein the plurality of splice joints are spaced apart from the plane by an offset distance.

3. The optical fiber cable assembly of claim 2, wherein the offset distance is between 1.5 mm and 9 mm from the plane.

4. The optical fiber cable assembly of claim 1, wherein the connector housing includes a potting adhesive in the inner channel and in between individual optical fibers of the first plurality of optical fibers and the second plurality of optical fibers.

5. The optical fiber cable assembly of claim 4, wherein the cured potting adhesive has a modulus of elasticity ranging between 0.1 GPa and 10 GPa.

6. The optical fiber cable assembly of claim 1, wherein the stripped sections of the first plurality of optical fibers and the second plurality of optical fibers are each at least 2.5 mm in length measured from the plurality of splice joints.

7. The optical fiber cable assembly of claim 1, wherein the stripped sections of the first plurality of optical fibers and the second plurality of optical fibers are each about 10 mm in length measured from the plurality of splice joints.

8. The optical fiber cable assembly of claim 1, wherein the optical fiber cable assembly has an insertion loss of less than 0.5 dB at a reference wavelength of 1310 nm.

9. The optical fiber cable assembly of claim 1, wherein the optical fibers of the fusion spliced optical fibers have a core misalignment of less than 1.5 μm when the first housing and the second housing are coupled.

10. The optical fiber cable assembly of claim 1, wherein the plurality of fusion spliced optical fibers are substantially parallel with the longitudinal axis of the connector housing.

11. An optical fiber cable assembly comprising:
a first fiber optic cable section comprising a first plurality of optical fibers, and a second fiber optic cable section comprising a second plurality of optical fibers, wherein the first plurality of optical fibers and the second plurality of optical fibers each comprise stacked optical fiber ribbons, wherein optical fibers of each of the first and second pluralities of optical fibers includes a pre-coated section and a stripped section, wherein the first fiber optic cable section is an outdoor cable comprising a plurality of subunits, each subunit including the first plurality of optical fibers, and wherein the second fiber optic cable section is an indoor cable;
a plurality of fusion splices including a plurality of splice joints joining ends of the stripped sections of the first plurality of optical fibers with ends of the stripped sections of the second plurality of optical fibers to form a plurality of fusion spliced optical fibers; and
a connector housing comprising a first housing, a second housing configured to couple to the first housing, and at least one wall that bounds an inner channel extending in a longitudinal direction of the housing;
wherein the plurality of splice joints are at least partially positioned in the inner channel, and wherein at least a portion of the pre-coated sections of the first plurality of optical fibers and the second plurality of optical fibers are positioned within the inner channel of the housing;
wherein the first housing and the second housing are coupled together along a plane aligned with contacting end faces of the first housing and the second housing, wherein the end faces of the first housing and the second housing form individual connectors.

12. The optical fiber cable assembly of claim 11, wherein the plurality of splice joints are spaced apart from the plane by an offset distance.

13. The optical fiber cable assembly of claim 12, wherein the offset distance is between 1.5 mm and 9 mm from the plane.

14. The optical fiber cable assembly of claim 11, wherein the connector housing includes a potting adhesive in the inner channel and in between individual optical fibers of the first plurality of optical fibers and the second plurality of optical fibers.

15. The optical fiber cable assembly of claim 11, wherein the connector housing comprises a first housing and a second housing defined by the plane, wherein the plane is angled relative to a longitudinal axis of the inner channel such that the first housing and the second housing are angled with respect to each other, the angle of the plane is less than or equal to about 90 degrees relative to the longitudinal axis.

16. The optical fiber cable assembly of claim 15, wherein the angle of the plane is about 8 degrees.

17. The optical fiber cable assembly of claim 11, wherein the stripped sections of the first plurality of optical fibers and the second plurality of optical fibers are each at least 2.5 mm in length measured from the plurality of splice joints.

18. The optical fiber cable assembly of claim 11, wherein the stripped sections of the first plurality of optical fibers and the second plurality of optical fibers are each about 10 mm in length measured from the plurality of splice joints.

19. The optical fiber cable assembly of claim 11, wherein the optical fiber cable assembly has an insertion loss of less than 0.5 dB at a reference wavelength of 1310 nm.

20. The optical fiber cable assembly of claim 11, wherein the optical fibers of the fusion spliced optical fibers have a core misalignment of less than 1.5 µm.

21. A method of preparing an optical fiber cable assembly, the optical fiber cable assembly including a first fiber optic cable section comprising a first plurality of optical fibers and a second fiber optic cable section comprising a second plurality of optical fibers, the method comprising:
  extracting the first plurality of optical fibers and the second plurality of optical fibers from the first fiber optic cable section and the second fiber optic cable section respectively;
  stripping a portion of the first plurality of optical fibers and a portion of the second plurality of optical fibers such that each optical fiber of the first and second pluralities of optical fibers includes a pre-coated section and a stripped section;
  splicing ends of the stripped sections of the first plurality of optical fibers with ends of the stripped sections of the second plurality of optical fibers to form a plurality of splice joints and a plurality of fusion spliced optical fibers;
  placing the plurality of fusion spliced optical fibers in a connector housing; and
  dicing the plurality of fusion spliced optical fibers and the connector housing along a plane, wherein the connector housing is diced into a first housing and a second housing that are positioned and oriented such that the first housing and the second housing face each other when the first housing and the second housing are joined.

22. The method of claim 21, further comprising: coating an end face of at least one of the first housing and the second housing with optical index matching gel or film.

23. The method of claim 21, wherein the plane is spaced apart from the splice joints of the plurality of fusion spliced optical fibers by an offset distance ranging between 1.5 mm and 9 mm.

24. The method of claim 21, further comprising: potting the plurality of fusion spliced optical fibers in the connector housing with a potting adhesive.

25. The method of claim 21, wherein the plane dices unstripped portions of the fusion spliced optical fibers.

26. The method of claim 21, wherein the step of placing the plurality of fusion spliced optical fibers in a connector housing further comprises:
  inserting the fusion spliced optical fibers into an inner channel of the connector housing;
  inserting a potting adhesive into the inner channel of the connector housing;
  placing an alignment plate onto the fusion spliced optical fibers and the potting adhesive within the inner channel of the connector housing;
    wherein the alignment plate has a width that is less than a width of the inner channel of the connector housing.

27. The method of claim 26, wherein the alignment plate has a flat edge and a plurality of V-grooves opposite the flat edge, wherein the plurality of V-grooves receive the fusion spliced optical fibers when the alignment plate is placed onto the fusion spliced optical fibers and the potting adhesive within the inner channel of the connector housing.

28. An optical fiber cable assembly comprising:
  a first plurality of optical fibers and a second plurality of optical fibers, wherein optical fibers of each of the first and second pluralities of optical fibers includes a pre-coated section and a stripped section;
  a plurality of fusion splices including a plurality of splice joints joining ends of the stripped sections of the first plurality of optical fibers with ends of the stripped sections of the second plurality of optical fibers to form a plurality of fusion spliced optical fibers; and
  a connector housing comprising a first housing, a second housing configured to couple to the first housing, and at least one wall that bounds an inner channel extending in a longitudinal direction of the housing;
    wherein the plurality of splice joints are at least partially positioned in the inner channel, and wherein at least a portion of the pre-coated sections of the first plurality of optical fibers and the second plurality of optical fibers are positioned within the inner channel of the housing;
  wherein the first housing and the second housing are coupled together along a plane aligned with contacting end faces of the first housing and the second housing, wherein the end faces of the first housing and the second housing form individual connectors; and
  wherein the first plurality of optical fibers and the second plurality of optical fibers each comprise stacked optical fiber ribbons.

\* \* \* \* \*